Dec. 7, 1926.　　　　F. W. STILWELL　　　　1,609,436
VEHICLE SPRING
Filed July 30, 1925　　　2 Sheets-Sheet 1
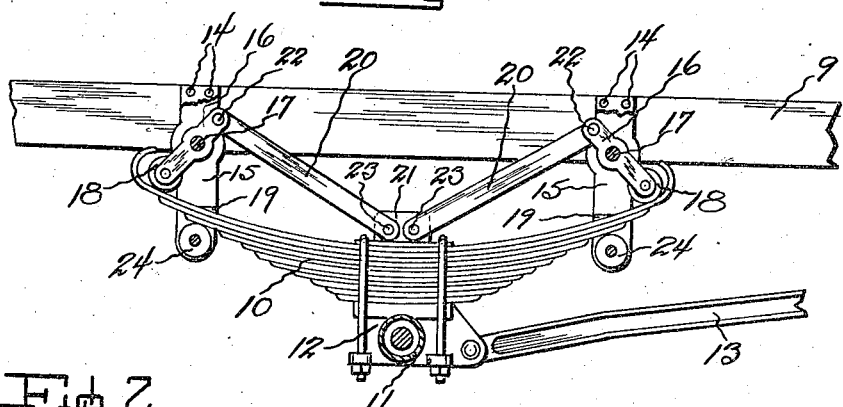
Fig. 1.
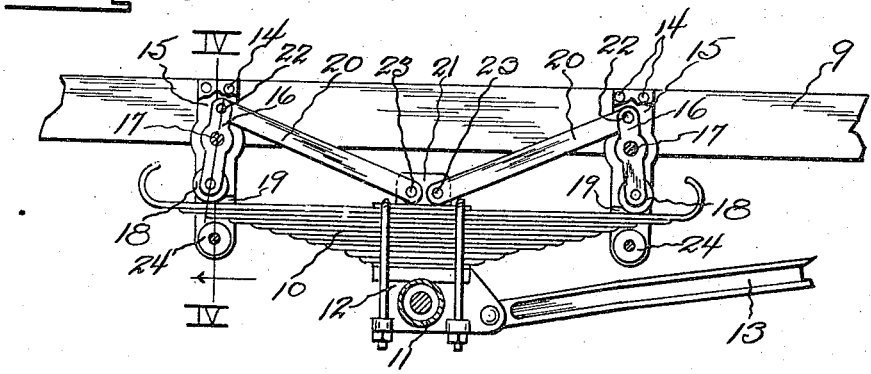
Fig. 2.
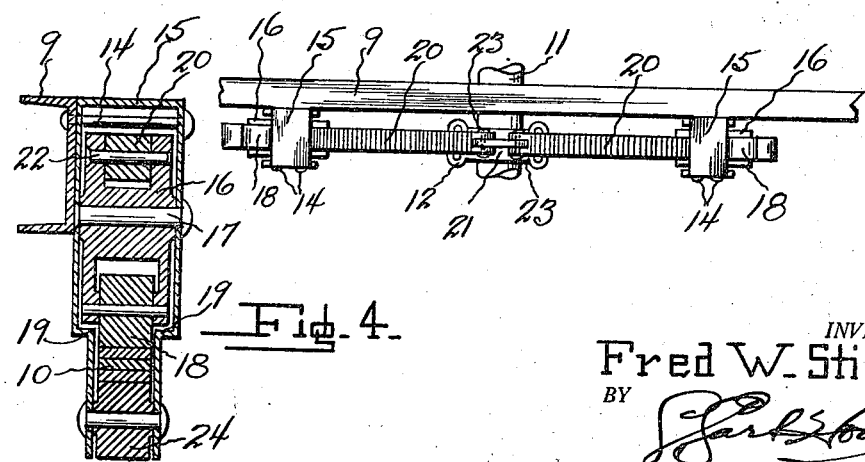
Fig. 3.
Fig. 4.
INVENTOR.
Fred W. Stilwell
BY
ATTORNEY.

Dec. 7, 1926.  F. W. STILWELL  1,609,436
VEHICLE SPRING
Filed July 30, 1925  2 Sheets-Sheet 2
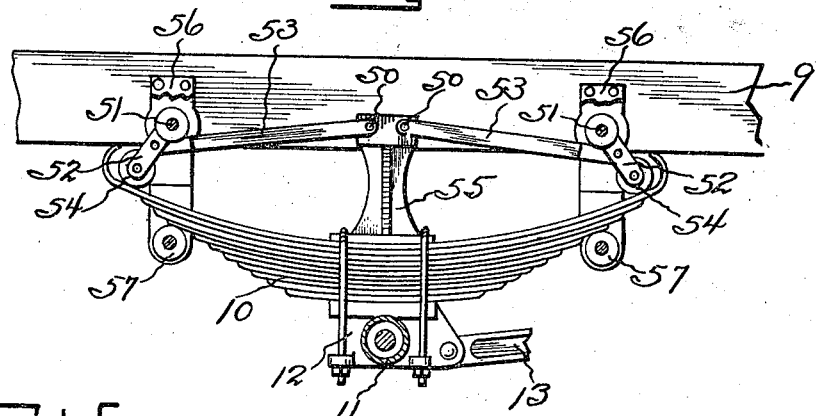
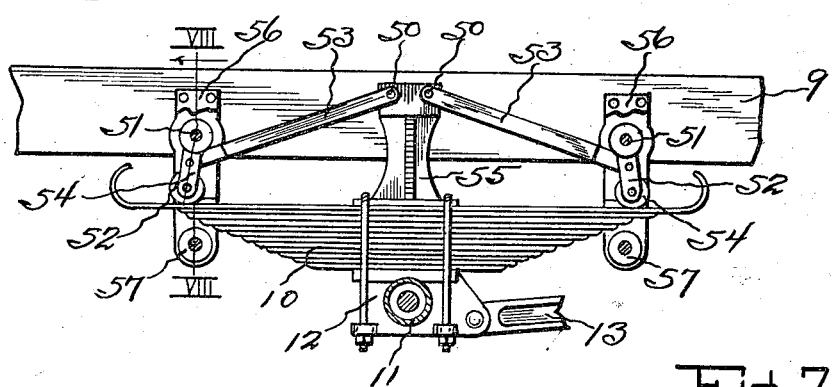
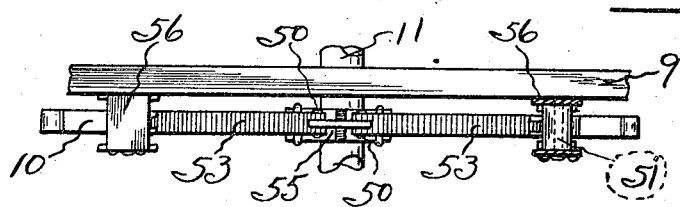
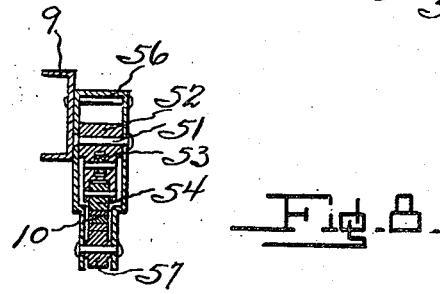
INVENTOR.
Fred W. Stilwell
BY
ATTORNEY.

Patented Dec. 7, 1926.

1,609,436

UNITED STATES PATENT OFFICE.

FRED W. STILWELL, OF KANSAS CITY, MISSOURI.

VEHICLE SPRING.

Application filed July 30, 1925. Serial No. 47,002.

This invention relates to a new and novel vehicle spring suspension, which is adapted to adjust itself with relation to the strength of the spring as the load on the vehicle spring is varied.

The primary object of this invention is the provision of a simply constructed device that may be placed on any standard make of motor vehicle to adjust its points of suspension along its leaf spring as the load is increased or decreased.

A further object of the present invention is to provide means for guiding the load bearing rollers along the upper surface of the spring.

An even further object of this invention is the provision of a rebound check which is formed as a part of the suspension means and which engages the under side of the vehicle spring.

Minor objects of the invention and novel features of construction will be set forth in the specification referring to the accompanying drawings, which illustrate the device constructed in accordance with this invention.

In the drawings:

Figure 1 is a fragmentary side elevation of a motor vehicle showing the preferred way of constructing the new spring suspension.

Fig. 2 is a similar view showing the spring forced downwardly by the load of the vehicle to nearly the maximum point.

Fig. 3 is a plan view of the device in the position illustrated in Fig. 1.

Fig. 4 is an enlarged detail sectional view of one of the supporting brackets taken along line IV—IV of Fig. 2, looking in the direction of the arrow.

Fig. 5 is a view similar to Fig. 1 showing a modified way of constructing the invention.

Fig. 6 is a view similar to Fig. 5 showing the spring forced to a horizontal position by the load of the vehicle.

Fig. 7 is a plan view of the device as shown in Fig. 6, and,

Fig. 8 is a detail sectional view of one of the brackets taken on line VIII—VIII of Fig. 6.

Like reference characters refer to like parts throughout the several views, and the numeral 9 designates the frame of the ordinary vehicle which also has the well-known imbricated leaf spring 10 rigidly supported by axle housing 11 through the use of any suitable member 12.

It is imperative that radius rods 13 be present in vehicles where this particular spring suspension is to be used. Their function is known, and to one skilled in the art, futher explanation is deemed unnecessary.

The means whereby the bearing points are caused to approach or leave the center of the spring 10 as the load upon the frame 9 is varied may be constructed as shown in Figs. 1 to 4 inclusive, which illustrates the preferred form of the instant invention.

To frame 9 and at points adjacent the ends of spring 10 are rigidly attached, by bolts or analogous means 14, a pair of brackets 15 having depending walls as shown in Fig. 4 between which spring 10 is adapted to pass.

An arm 16 pivotally supported by each of brackets 15 through pinion 17 which passes therethrough intermediate the ends thereof is provided at one end with a spring engaging roller 18 which rests upon the top of spring 10 and is retained in engagement therewith by the inturned portion 19 of bracket 15. This narrowing of bracket 15 keeps the roller 18 from sliding off of the spring during its movement thereover.

To the other end of arm 16 is connected a truss lever 20 which links the same to member 21 rigidly attached to spring 10 at its vertical center. The points of connection of truss lever 20 are pivotal, as at 22 and 23, and permit the raising and lowering of frame 9. As weight or a load is added to the vehicle, frame 9 is forced downwardly, carrying brackets 15 and straightening spring 10. As this takes place, truss levers 20 each thrust outwardly (by having their pivotal points forced through the arc of a circle) and cause rollers 18 to move along spring 10 toward its center or heavier, stronger portion. As the load is decreased, the opposite movement takes place. A sudden upward jerk or rebound by the frame 9 will be checked by roller 24, which is preferably made of some resilient substance and supported at the lowermost point of bracket 15 so that the under side of spring 10 is nearly in engagement therewith at all times.

It will be noticed, in the preferred form, that the points 23 of truss lever 20 are below the horizontal plane of pintle 17. In the event the invention is constructed in accordance with the modified form shown in Figs. 5 to 8 inclusive, the corresponding point designated as 50 must be placed to be slightly above the point of connection 51 of arm 52. In this form, the truss lever 53 joins arm 52 between roller 54 and point 51 and the increased load on frame 9 causes the same to pull inwardly, thus causing roller 54 to approach the vertical center of spring 10.

The necessary change in this construction is a member 55 and arm 52. The function of bracket 56 and rebound check roller 57 remain the same, and, in general, the principal is unchanged.

The operation of the device has been made obvious throughout the specification.

What I claim is:

1. In combination with a vehicle frame and spring, means for moving the load bearing points toward or away from the center of said spring as the weight on said frame is varied comprising in combination, a bracket rigidly supported against relative movement by said frame above the ends of said spring, a roller resting on said spring at each end thereof and maintained in engagement therewith by said rigidly supported bracket and means for imparting movement to said roller as said frame raises and lowers with respect to the center of said spring and a rebound check carried by said rigid bracket.

2. In a vehicle spring suspension, means for moving the load bearing points toward or away from the center of the vehicle spring as the weight on the vehicle frame is varied comprising, in combination, a pair of brackets rigidly supported by said frame and means carried by each of said brackets for engaging said spring at different points along its upper surface.

3. In a vehicle spring suspension, means for moving the load bearing points toward or away from the center of the vehicle spring as the weight on the vehicle frame is varied comprising, in combination, a pair of brackets rigidly supported by said frame above the ends of said spring and means pivotally supported by each of said brackets for engaging said spring.

4. In a vehicle spring suspension, means for moving the load bearing points toward or away from the center of the vehicle spring as the weight on the vehicle frame is varied comprising. in combination, a pair of brackets rigidly supported by said frame adjacent the ends of said spring each having a pair of depending walls between which the respective ends of the spring pass and means carried by each of said brackets for engaging said spring.

5. In a vehicle spring suspension, means for moving the load bearing points toward or away from the center of the vehicle spring as the weight on the vehicle frame is varied, comprising, in combination, a pair of brackets rigidly supported by said frame each having depending walls between which the spring is positioned and a pivotally mounted arm having a spring engaging roller carried by each of said brackets.

6. In a vehicle spring suspension, means for moving the load bearing points toward or away from the center of the vehicle spring as the weight on the vehicle frame is varied comprising, in combination, a pair of brackets rigidly supported by said frame each having a pair of depending walls between which the spring is positioned, a pivotally mounted arm having a spring engaging roller carried by each of said brackets and means integral with each of said brackets for guiding said roller along said spring.

7. In a vehicle spring suspension, means for moving the load bearing points toward or away from the center of the vehicle spring as the weight on the vehicle frame is varied comprising. in combination, a pair of brackets rigidly supported by said frame each having a pair of depending walls between which the spring is positioned, a pivotally mounted arm having spring engaging means at one end thereof carried by each of said brackets and means connecting said arm with a rigid support, carried by said spring at the center thereof.

8. In a vehicle spring suspension, means for moving the load bearing points toward or away from the center of the vehicle spring as the weight on the vehicle frame is varied comprising, in combination, a pair of brackets rigidly supported by said frame each having a pair of depending walls adapted to pass on either side of said spring, a pivotally mounted arm having a spring engaging roller at one end thereof carried by each of said brackets between the depending walls thereof, a member carried by said spring at the vertical center thereof and means connecting said arm with said member.

9. In a vehicle spring suspension, means for moving the load bearing points toward or away from the center of the vehicle spring as the weight on the vehicle frame is varied comprising, in combination, a pair of brackets rigidly supported by said frame each having a pair of depending walls adapted to pass on either side of said spring, a pivotally mounted arm having a spring engaging roller carried by each of said brackets, a member rigidly carried by said spring at the vertical center thereof and a truss lever connecting said arm with said rigid member.

10. In a vehicle spring suspension, means for moving the load bearing points toward or away from the center of the vehicle spring as the weight on the vehicle frame is varied comprising, in combination, a pair of brackets rigidly supported by said frame each having a pair of depending walls adapted to pass on either side of said spring, a pivotally mounted arm having a spring engaging roller carried by each of said brackets, a member rigidly carried by said spring at the vertical center thereof, a truss lever connecting said arm with said rigid member and supported between said depending walls of each of said brackets above said spring.

11. A vehicle spring suspension comprising, in combination, an imbricated leaf spring secured adjacent its center to the axle housing of said vehicle, means rigidly supported by the frame of said vehicle having pivotally supported means for engaging said spring adjacent each of its ends and means for varying the point of contact between said engaging means and said spring as the load of said vehicle is varied, said bracket adapted to travel in a vertical line as the roller travels in a path along the upper surface of said spring.

12. In a vehicle spring suspension, a bracket rigidly carried by the vehicle frame having depending walls adapted to pass on either side of the vehicle spring, a spring engaging roller carried by a pivotally mounted arm above said spring, means for changing the bearing points of said roller along said spring as the weight on said frame is varied and a roller supported between said depending walls of each of said brackets beneath said spring and adapted to check the rebound by engaging the under side of said spring.

In testimony whereof I hereunto affix my signature this 23rd day of July, 1925.

FRED W. STILWELL.